March 10, 1931.    W. H. JOHNSTON    1,795,954
HAND BRAKE MECHANISM
Filed Aug. 26, 1927    2 Sheets-Sheet 1
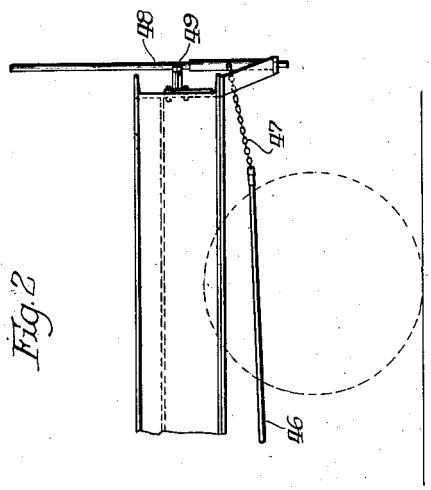
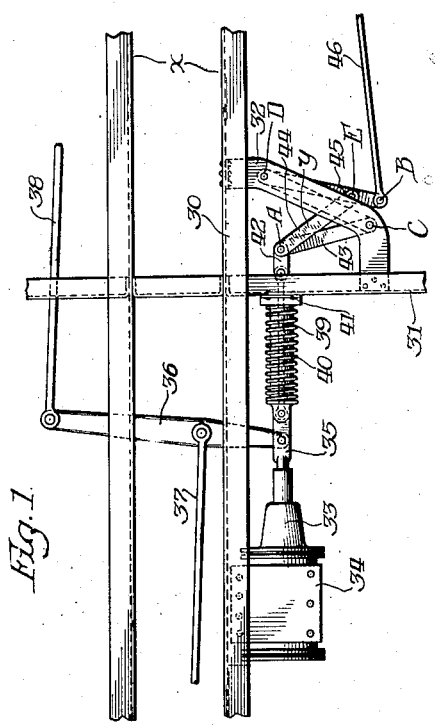
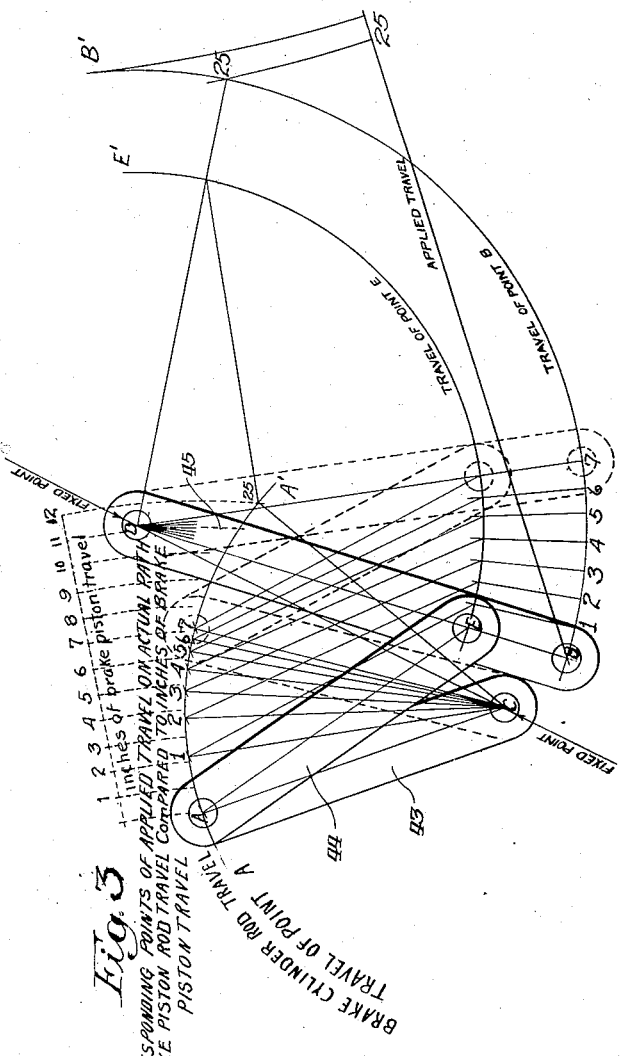
Witness:
R. Burkhardt.
Inventor:
William H. Johnston
By D. Anthony Usina
Atty

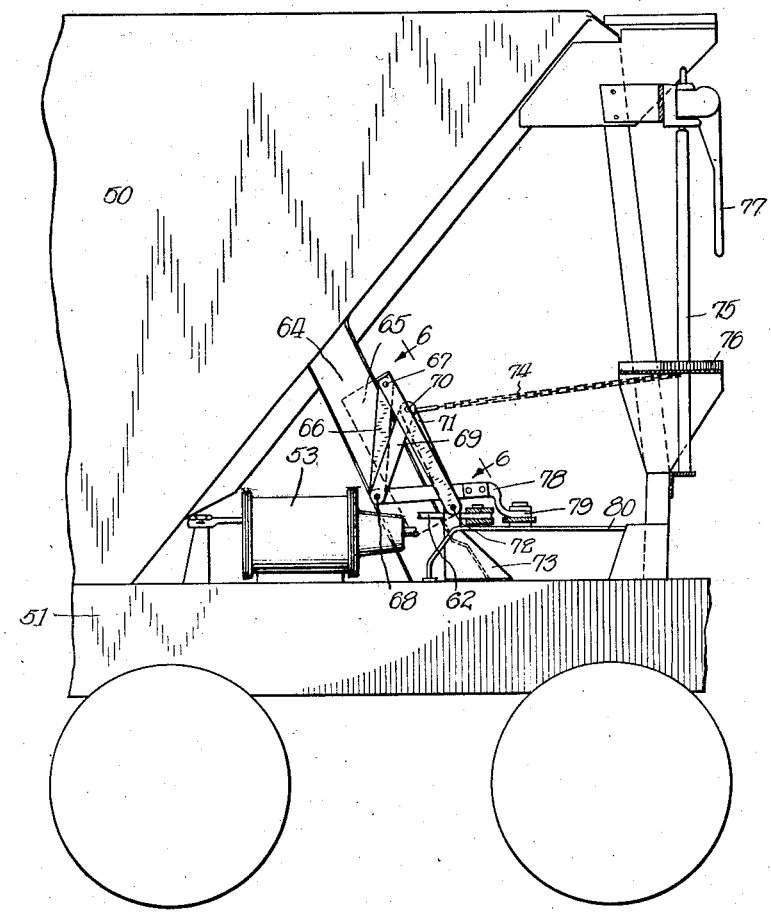

Patented Mar. 10, 1931

1,795,954

UNITED STATES PATENT OFFICE

WILLIAM H. JOHNSTON, OF PROCTOR, MINNESOTA

HAND-BRAKE MECHANISM

Application filed August 26, 1927. Serial No. 215,612.

The invention pertains to a hand brake, and more particularly to a hand brake booster of such construction and disposition of parts that there will be a quick initial take-up of the brake chain without necessairly enlarging or multiplying any parts of the brake staff connections.

It is a requirement of the A. R. A. that the hand brake power must be equal to the power developed by the air brake cylinder with fifty pounds air pressure per square inch. This recommendation is commonly made by increasing the length of the cylinder lever, or an auxiliary lever, sheave wheel, etc., which method is objectionable in that an excess length of chain is required to be wrapped around the brake staff drum, which requires a greater length of time to set the hand brakes with the possibility that the excess chain will lap or foul itself when wound around the brake staff drum. Difficulty has always been encountered in obtaining the speed necessary for a quick take-up of the chain, together with the proper power for the brake application, due to the fact that devices designed to produce both of these effects are complicated and are expensive.

It is therefore an object of the invention to provide a simple, effective and positive device for insuring obtaining hand brake power equal to that power developed by the air brake cylinder at fifty pounds air pressure per square inch without increasing either the size or unduly increasing the number of the brake controlling parts.

Another object is to provide a mechanical movement of such nature and disposition of parts as to provide an advantage in the initial movement of the hand brake mechanism.

Still another object is to provide a mechanism of such character as will afford a quick initial take-up of the brake mechanism, yet which may readily be placed on a car so as not to occupy otherwise useful space.

A further object is to provide a hand brake booster which reduces the time element to bring the brake shoes in contact with the car wheels and produces a multiplying power to meet the requirements of the A. R. A.

A still further object is to provide a multiplying mechanism for quick initial take-up of brakes controlled by a plurality of operating mechanisms which multiplying mechanism is connected to operating mechanism by pull and/or push rods.

Other, various and more specific objects will readily occur from the detailed description and drawings appended hereto.

In the drawings, wherein like reference characters are used to designate like parts—

Figure 1 is a plan view of a car underframe, showing the relation of the brake cylinder with the brake lever and hand brake booster in released position;

Figure 2 is a side elevation of one end of a car, showing the connection between the brake staff rod and staff drum;

Figure 3 is a plan view showing the disposition of the parts of the brake staff booster in brake release position, similar to Figure 1, and indicating intermediate positions for illustrating the relation of the travel of the hand brake connection to that of the brake cylinder connection.

Figure 4 is a partial elevation of one end of a hopper car showing the application of a modification of the brake system thereto;

Figure 5 is a partial plan of the brake setting mechanism shown in Figure 4; and Figure 6 is an enlarged sectional elevation of the multiplying mechanism, taken substantially on the plane as indicated by the line 6—6 of Figure 4.

Referring more particularly to the embodiment shown in Figures 1 to 3 inclusive, the usual car underframe X, comprising members 30, 31, etc., is adapted to carry the hand brake booster Y disposed on a bracket between longitudinal and transverse members. The longitudinal member or sill 30 supports the brake cylinder 33 by any means, such as a bracket 34. The cylinder is provided with the usual piston 35 pivoted to the floating brake lever 36 having the brake shoe rods 37 and 38 pivoted thereto. The piston 35 is also pivoted to some means, such as the rod 39, having the spring 40 surrounding and cooperating therewith to insure the piston returning to brake releasing position. This rod 39 passes through the cross beam 31 having a bracket or rod bearing 41 providing a shoulder for the spring 40, and is attached to a link 42 pivoted to the fulcrum A of the series of links comprising the hand brake booster.

Also fulcrumed at A and pivoted to the bracket 32 at C is a link 43. Link 44, also pivoted at A, has its opposite end pivoted at a point E intermediate the points D and B of the link 45, said points being pivoted respectively to the bracket 32 and to the hand brake rod 46. This rod at its opposite end is provided with a suitable length of chain 47 attached to the drum of the brake staff 48 supported on the bracket 49, said chain being adapted to be wound around said drum to cause the setting of the brakes.

Referring particularly to Figure 3, it will be seen that when the applied travel of the point B, operated by the hand brake, is one inch, the travel of the brake cylinder rod, that is, point A, which it will be understood sets the brakes through the brake lever 36, is slightly over two inches, as indicated at 1 on the arc A, A'.

Referring now more particularly to the modification shown in Figures 4 to 6 inclusive, a hopper car 50 having the usual underframe 51 may have brake operating cylinders, shown as load and empty cylinders 52 and 53 respectively, supported on a portion of the underframe under the sloping end hopper sheet. These cylinders may be of the usual fluid type, having pistons connected at 54 and 55 respectively to a floating brake operating lever 56 pivoted at one end at 57 to a portion of the car underframe. This pivoted lever is pivoted at 58 to a link 59 which in turn is pivoted at 60 to the floating brake lever 61 having the usual brake shoe operating rods 62 and 63 pivoted at the ends thereof. An end hopper strut 64 may be conveniently used for supporting a bracket 65 carrying the multiplying lever mechanism. This mechanism consists of a lever 66 pivoted to the bracket 65 at 67, said lever 66 being provided with a floating pivot 68 for attachment of the link 69 which is pivoted by another floating pivot 70 to a link 71 pivoted at 72 to a bracket 73 which may be conveniently supported by the underframe 51. Any suitable connecting means, such as a chain 74, may be connected at the floating pivot 70 to the multiplying mechanism, the other end of said chain being connected to a hand brake staff 75 which may be conveniently carried by a suitable mounting 76, said staff being provided at or near its upper end with any convenient actuating lever 77. Pivoted to the floating pivot 68 is a push rod 78 pivoted at its other end at 79 to the floating brake lever operating lever 56, said pivot point 79 being remote from the pivot point 57 of said lever. Attached to the underframe, there may be provided a guide or track 80 for the purpose of supporting the links in a horizontal position at all times.

In the operation of the first embodiment of the device, in the brake released position shown in Figure 1 and in full lines in Figure 3, the links 44 and 43 are disposed in a certain angular position with respect to the link 45 and the bracket 32 so that when the chain 47 is wrapped around the brake drum due to actuation of the brake staff, the points A, B and E will move on their respective arcs. The point B moving on arc B, B' will cause the point E to move on an arc E, E', causing the point A of the links 43 and 44 to travel in the arc A, A', pivoting around C to corresponding positions determined by the position of the point E and the length of the link 43. Like numbers on the various arcs represent like positions at any time. As the point A travels, it will be understood that the link 42, rod 39 and piston 35 will move in the direction of the point A, compressing the spring and thereby causing movement of the floating member 36 which will cause a setting of the brakes. It is desirable that only about seven inches, or at the most nine inches, of chain be wound around the brake drum to prevent lapping of the chain, and it will be seen by a reference to the successive points 1, 2, 3 to 7 on the arc B, B', and the corresponding points 1, 2, 3 to 7, that for this travel there is a quicker initial movement of the point A, and therefore of the brake lever, than there is of the point B corresponding to the travel of the rod 46 for the amount of chain wrapped around the brake. This relation of the movement between the points B and A produces an amplifying power on the brake and also insures a quick initial take-up of the chain and a limited amount of brake chain wound around the brake drum.

In the modification of the device shown in Figures 4 and 5, it will be readily understood that the brakes may be applied manually by actuating the lever 77, winding the chain 74 around the brake staff 75. This will draw the floating pivot 70 to the right, viewed in Figure 4, causing the link 71 to rotate around the point 72. This will cause the link 66 to move toward the right, rotating around the point 67, the points 67 and 72 being so arranged that during the initial actuation of the mechanism, the point 68 will move a greater distance than the point 70. This then will cause the push rod 78 to move toward the right, rotating the lever 56 around the point 57, thereby causing the floating brake lever 61 to set the brakes. It will of course be understood that when the brakes are set by fluid actuation, the pistons of the operating cylinders will be moved toward the right, causing the lever 56 to rotate around the point 57, setting the brakes through the floating lever 61. On release of the hand brake or operating cylinders, the brakes may be released either by introducing air into the operating cylinders or by suitable springs provided in said cylinders for that purpose.

It is to be understood that the embodiment shown is merely by way of illustration and not limitation, as other and various forms of the device will readily occur to those skilled in the art.

I claim:

1. In a device of the character described, the combination of a brake cylinder, a brake staff, and a brake connection between said brake staff and brake cylinder comprising a system of levers for operating the brake, said levers including a lever connected to the brake cylinder and pivoted to the car, a lever connected to the brake staff and pivoted to the car and a floating means pivoted to said levers.

2. In a device of the character described, the combination of a brake cylinder, a brake staff, and a brake connection between said brake staff and brake cylinder comprising a system of levers for operating the brake, said levers including a lever connected to the brake cylinder and pivoted to the car, a lever connected to the brake staff and pivoted to the car and a lever pivoted to said levers.

3. In a device of the character described, the combination of a brake cylinder, a brake staff, and a brake connection between said brake staff and brake cylinder comprising a system of levers for operating the brake, said levers comprising a lever connected to the brake cylinder and pivoted to the car, a lever connected to the brake staff and pivoted to the car, and a floating means pivoted to said levers between the brake cylinder and the staff connection.

4. In a device of the character described, the combination of a brake cylinder, a brake staff, and a brake connection between said brake staff and brake cylinder comprising a system of levers for operating the brake, said levers comprising a lever connected to the brake cylinder and pivoted to the car, a lever connected to the brake staff and pivoted to the car, and a lever pivoted to said levers between the brake cylinder connection and the staff connection.

5. In a device of the character described, the combination of a bracket fixed to a car, a brake staff, means connecting said brake staff to a brake operating means comprising a plurality of means pivoted to the bracket and connected by a floating means, and a connection between said brake operating means and the brakes.

6. A hand brake booster comprising a bracket, a member pivoted to said bracket and connected to the hand brake, a brake beam operating means pivoted to the bracket, and a floating member pivotally connecting said pivoted member and said means.

7. A hand brake booster comprising a bracket, a member pivoted to said bracket and connected to the hand brake, a brake beam operating means pivoted to the bracket, and a floating member pivotally connecting said pivoted member and said means, said floating member being of such length and so positioned that multiplying power and quick initial take-up is effected by operation of the hand brake.

8. In a device of the character described, the combination of a plurality of operating mechanisms, a multiplying means cooperating with said mechanisms to impart quick initial take-up when setting brakes, said means including a plurality of pivoted levers connected by a floating pivoted lever, a connection from one of the floating pivots to one of said mechanisms, and connections from the other of the floating pivots to the brakes.

9. In a device of the character described, the combination of a plurality of operating mechanisms, a multiplying means cooperating with said mechanisms to impart quick initial take-up when setting brakes, said means including a plurality of pivoted levers connected by a floating pivoted lever, connections from one of the floating pivots to one of said mechanisms and said brakes, and a connection from one of said pivoted members to the other of said mechanisms.

Signed at Proctor, Minnesota, this 16th day of August, 1927.

WILLIAM H. JOHNSTON.